United States Patent
Kulakowski et al.

(10) Patent No.: US 6,298,017 B1
(45) Date of Patent: Oct. 2, 2001

(54) LOCKING METHOD AND APPARATUS FOR MULTI-DISK CARTRIDGE

(75) Inventors: John Edward Kulakowski; Rodney Jerome Means, both of Tucson, AZ (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 08/414,248

(22) Filed: Mar. 31, 1995

(51) Int. Cl.[7] .............................. G11B 17/22; G11B 15/68
(52) U.S. Cl. ................................ 369/36; 369/191; 360/92
(58) Field of Search .................... 369/36, 34, 37; 360/98.04, 98.05, 98.06, 191, 92; 395/442, 439, 440, 441, 833; 364/478.02, 478.06

(56) References Cited

U.S. PATENT DOCUMENTS

| | | | |
|---|---|---|---|
| 4,685,095 | * | 8/1987 | Rudy et al. ........................... 369/36 |
| 4,805,094 | * | 2/1989 | Oye et al. ........................... 364/200 |
| 5,014,258 | * | 5/1991 | Takemasa et al. ..................... 369/36 |
| 5,022,019 | * | 6/1991 | Motoyoshi et al. ............. 360/98.06 |
| 5,022,020 | | 6/1991 | Langman et al. ..................... 369/37 |
| 5,036,503 | * | 7/1991 | Tomita .................................. 369/36 |
| 5,084,859 | | 1/1992 | Ishibashi et al. ....................... 369/34 |
| 5,099,465 | * | 3/1992 | Geiger et al. ......................... 369/36 |
| 5,107,474 | | 4/1992 | Ishibashi et al. ....................... 369/36 |
| 5,214,628 | | 5/1993 | Langman et al. ...................... 369/37 |
| 5,228,016 | | 7/1993 | Menke ................................... 369/36 |
| 5,274,516 | * | 12/1993 | Kakuta et al. .................... 360/98.04 |
| 5,303,214 | * | 4/1994 | Kulakowski et al. ............ 360/98.04 |
| 5,345,349 | * | 9/1994 | Pierrat .................................... 369/36 |
| 5,434,833 | * | 7/1995 | Lee ........................................ 369/36 |
| 5,566,316 | * | 10/1996 | Fechner et al. ..................... 395/441 |

* cited by examiner

Primary Examiner—William Klimowicz
(74) Attorney, Agent, or Firm—Dan Hubert & Associates

(57) ABSTRACT

A method and apparatus for ensuring the proper position and orientation of a multi-disk cartridge, and for selectively locking the cartridge while it is inserted in a disk drive to prevent withdrawal of the cartridge while the disk drive is conveying one of the cartridge's disks. The disk drive of the invention includes a guide to slidably receive a multi-disk cartridge. When the cartridge is inserted in the guide, presence of the cartridge in the drive is detected by a position sensor. Having detected the presence of the cartridge, an orientation sensor determines whether the cartridge has been oriented properly. This prevents upside-down insertion of the cartridge, for example. With the cartridge fully inserted into the guide in a proper orientation, a locking mechanism serves to lock the cartridge in place at selected times. The cartridge may be locked in place, for example, at all times when the cartridge is inserted into the guide, or merely during sensitive operations of the disk drive.

20 Claims, 13 Drawing Sheets

LOCKING METHOD AND APPARATUS FOR MULTI-DISK CARTRIDGE

BACKGROUND OF THE INVENTION

1. Field of the Invention

The present invention relates to a system used to operate a multi-disk cartridge with a disk drive. More particularly, the invention concerns a method and apparatus for ensuring the proper position and orientation of a multi-disk cartridge, and for selectively locking the cartridge while it is inserted in the disk drive to prevent withdrawal of the cartridge while the disk drive is conveying one of the cartridge's disks.

2. Description of the Related Art

Today's market offers a variety of media for storing digital data. Many of these involve disk-shaped storage devices such as rigid 3.5" diskettes, floppy 5.25" diskettes, and single-disk optical cartridges, all of which enjoy widespread use with personal computers. Presently, these storage schemes do not require or provide any means for locking the storage device in the disk drive.

With rigid diskette drives, for instance, the diskette is inserted completely into the drive to use it, whereupon the diskette is inaccessible by human users. To eject the diskette, the user simply presses a button typically positioned on the drive's face. Pressing the button mechanically ejects the rigid diskette from the drive.

With floppy diskette drives, the diskette is also inserted completely into the drive. When fully inserted, however, the drive exposes a small gripable portion of the diskette. After the diskette is inserted into the drive, the drive will not access the diskette until the user manually pivots a latch to block withdrawal of the diskette. To remove the diskette, the user simply pivots the latch into its dormant position, and slidably removes the diskette from the drive.

Known optical data storage disks are provided in single disk packages called "cartridges". These cartridges are designed to be operated like rigid diskettes. Namely, a single-disk optical cartridge is inserted completely into a corresponding drive, making the cartridge inaccessible by human users. To remove the cartridge, the user presses an unload button positioned near the drive, which ejects the cartridge.

Although the above-mentioned devices provide many useful features, IBM Corporation's introduction of multi-disk optical cartridges creates a new problem. In packaging, the multi-disk optical cartridge format resembles the single-disk optical cartridge. To use the cartridge, it is inserted substantially into the drive. However, a grippable face portion of the cartridge remains outside the drive, advantageously permitting the user to remove the cartridge at certain times. For instance, the cartridge may be removed from a drive after one of its disks has been mounted in that drive. However, when a disk is transferred between the cartridge and a disk drive, the withdrawal of the cartridge may damage the disk drive. Therefore, the multi-disk cartridge must be locked in place at certain times.

For multi-disk cartridge applications, then, the existing disk drives are not satisfactory. The rigid diskette drive and single-disk optical cartridge both permit the user to withdraw the diskette at any time by pushing an eject button. The floppy drive permits the user to withdraw the diskette at any time by pivoting the latch and slidably withdrawing the diskette.

At first glance, some benefit appears to be available by studying systems related to compact disks ("CDs") used to play music. Like the multi-disk optical cartridge of the computer industry, music CDs are often dispensed in multiple disk magazines. The user first places multiple CDs in different trays of a CD magazine, and then the user loads the CD magazine into a CD player. Then, the CD player individually loads a CD, optically reads it, and generates an electrical signal representative of the digital music stored on the CD.

Like multi-disk cartridge drives in computers, CD players are potentially vulnerable to damage from premature removal of the CD magazine. In particular, a CD player may be damaged if the CD magazine is withdrawn while the CD player is inserting a CD into the CD magazine or removing a CD therefrom. Thus, engineers have designed CD players that enclose their CD magazines sufficiently to prevent users from gripping and removing the CD magazines. When the CD magazine is inserted sufficiently into the CD player, the CD player mechanically conveys the CD magazine deeply into the CD player, often so that the CD magazine's face is flush with the CD player's face. This prevents premature removal of the CD magazine, since the user simply cannot get a grip on the CD magazine. To remove the CD magazine, the user presses an "unload" button, causing the CD player to restore all CDs to the CD magazine and eject the CD magazine.

Although CD players may provide certain advantages for some applications, this art is unsatisfactory for use with the new multi-disk optical cartridges of the computer industry. First, as mentioned above, a CD player effectively locks-in a CD magazine by enveloping it so deeply that a user cannot grip the CD magazine. However, as discussed above, computer-readable multi-disk cartridges are constructed so that a grippable face of the cartridge protrudes from a drive when the cartridge is inserted into the drive. With this arrangement, the cartridge cannot be drawn into the drive, as a CD magazine would be drawn into a CD player. In fact, this would be undesirable since it may be advantageous to insert a multi-disk cartridge into a disk drive, load one disk from the cartridge into the disk drive, then permit a user or a library picker to remove the disk from the drive without disturbing the presently loaded disk. However, a multi-disk cartridge of this arrangement is susceptible to premature removal from the disk drive, presenting a problem that is not addressed by the CD art.

Accordingly, the state of the art is inadequate to solve the problems presented by the new multi-disk optical cartridge systems.

SUMMARY OF THE INVENTION

Generally, the invention concerns a method and apparatus for ensuring the proper position and orientation of a multi-disk cartridge, and for selectively locking the cartridge while it is inserted in a disk drive to prevent withdrawal of the cartridge while the disk drive is conveying one of the cartridge's disks. The disk drive of the invention includes a cartridge guide to slidably receive the multi-disk cartridge, as well as a disk picker positioned relative to the cartridge guide to exchange disks between the cartridge and a spindle. Proximate the cartridge guide, an electrically operated locking mechanism is mounted, which is responsive to an electrical input signal provided by a host to selectively lock the cartridge in place while the cartridge is inserted into the cartridge guide. In an illustrative embodiment, the cartridge may comprise a container for storing optical data storage media. The locking mechanism preferably comprises a solenoid, which selectively holds a latch in place to prevent withdrawal of the cartridge from the drive. In this respect, the multi-disk cartridge of the invention may define a notch, in a position to aid the latch and the locking mechanism.

In accordance with the different aspect of the present invention, the multi-disk cartridge may include a reflective strip. A light sensor is provided within the disk drive to detect presence of the reflective strip, where the light sensor is mounted such that the light sensor and the reflective strip are aligned when cartridge is inserted into the cartridge guide. The light sensor includes a light detecting element and a light emitting element.

In accordance with still another aspect of the invention, the disk drive includes a position sensor to detect insertion of a multi-disk cartridge into the disk drive. The position sensor, in one embodiment, comprises a light-emitting element and a light-detecting element to produce and receive a light beam that is broken when the multi-disk cartridge is inserted into the disk drive. Alternatively, the position sensor may comprise another suitable sensor, such as a pressure transducer.

The invention affords its users with a number of distinct advantages. The invention provides a disk drive that recognizes the insertion of a multi-disk cartridge, and also recognizes whether that cartridge has been properly oriented. Additionally, at selected times the invention locks the cartridge in the disk drive. The invention therefore prevents a number of different problems that might otherwise interfere with the disk drive's reading and writing of data.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Broadly, the present invention concerns a system for operating a multi-disk cartridge and a disk drive. One particularly advantageous feature of the invention is that it selectively locks the cartridge in the disk drive, preventing withdrawal of the cartridge while the disk drive is conveying one of the cartridge's disks.

Cartridge Construction

Figure 1A:
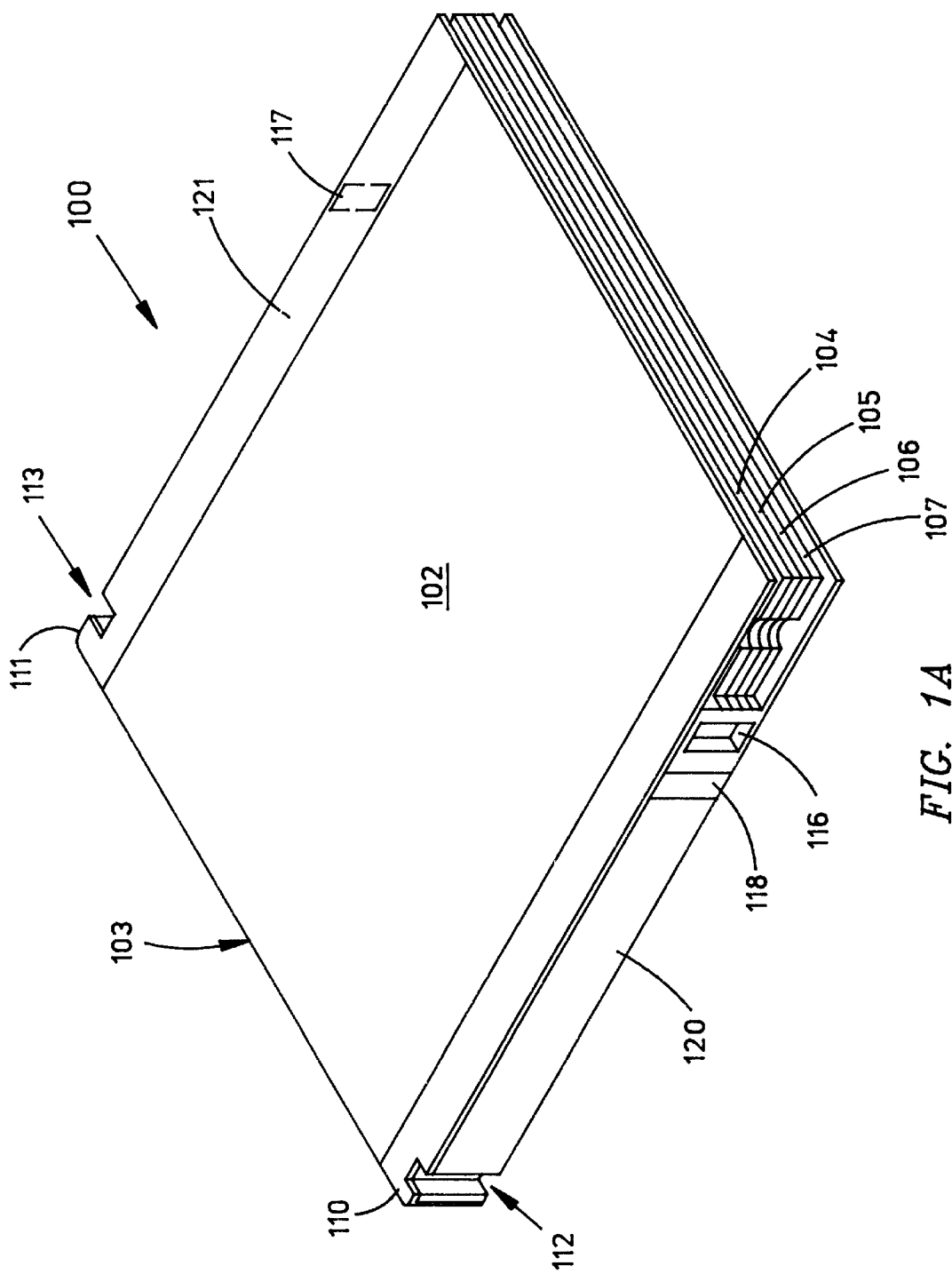
FIG. 1A is a diagram showing a rear perspective view of an illustrative multi-disk cartridge in accordance with the present invention.
Figure 1B:
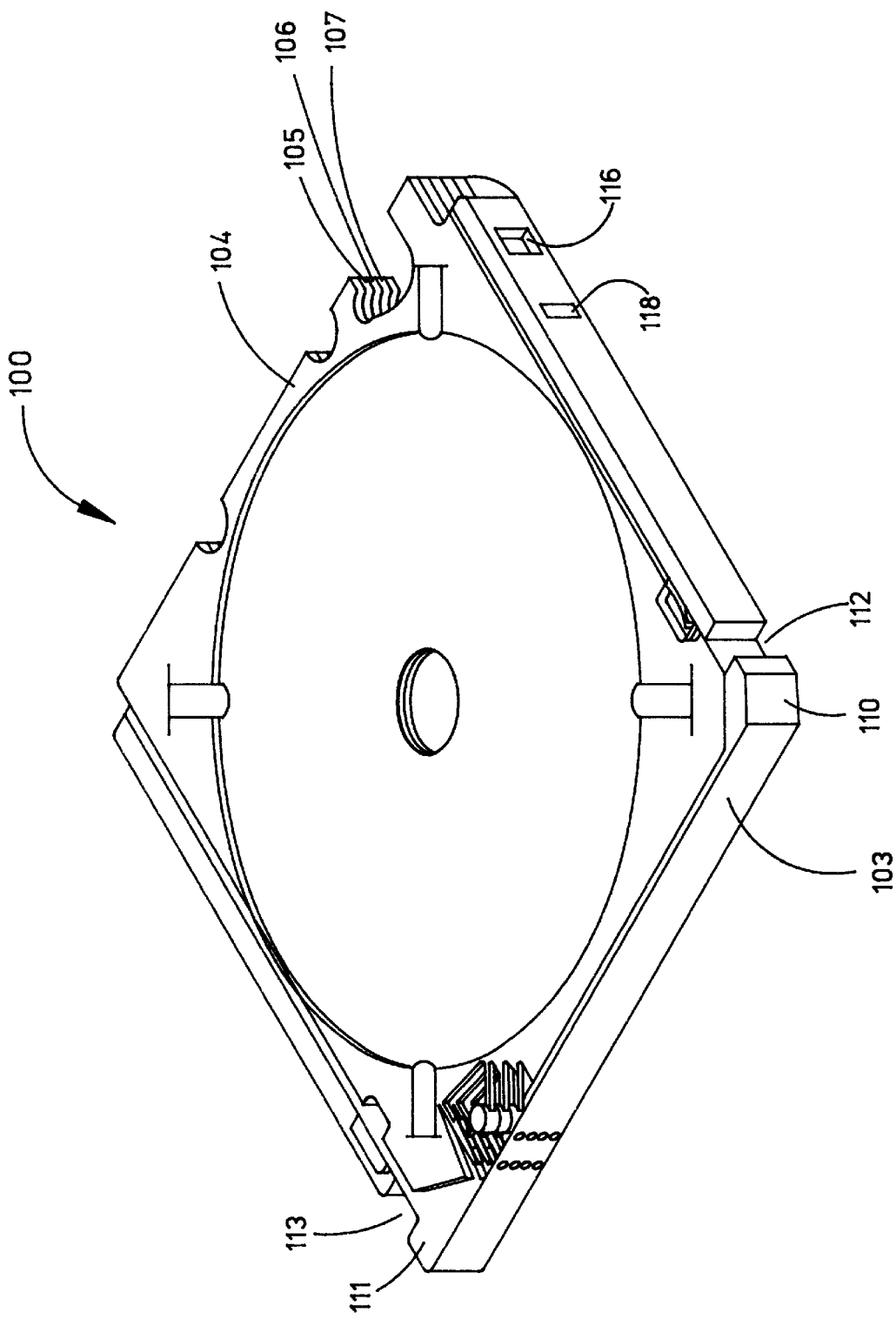
FIG. 1B is a diagram showing an cut-away front perspective view of an illustrative multi-disk cartridge in accordance with the present invention, with a top portion of its cartridge shell removed.

As shown in FIGS. 1A–1B, one aspect of the present invention includes a multi-disk cartridge 100 for use with an optical disk drive (described herein below) of a digital computing system. The cartridge 100 is preferably made from a lightweight, low-cost, light-absorbent material such as plastic. The cartridge 100 includes a cartridge shell 102, which includes a face 103 that is exposed when the cartridge 100 is inserted into an optical disk drive. The face 103 defines opposing tabs 110–111, which correspond to notches 112–113 defined in the shell 102. The tabs 110–111 and notches 112–113 assist a library picker (described in greater detail below) in inserting and removing the cartridge 100 into and out of a disk drive, and also assist in preventing the improper insertion of the cartridge 100 into a disk drive.

The cartridge 100 houses multiple stacked trays 104–107. Each tray 104–107 may support one optical disk. Preferably, the trays 104–107 are of identical construction, as are the disks that reside therein. However, since the disk of each tray 104–107 may contain different information, the positions of the trays 104–107 are distinguished from each other. In particular, the position in which a tray resides is called a "slot". As illustrated in FIGS. 1A–1B the cartridge 100 includes four slots. Slots are designated by the letters A–D (not shown), such that the "A" slot contains the tray 104, the "D" slot contains the tray 107, and so on.

After a user slides the cartridge 100 into the optical disk drive, a disk picker selects one of the disks by removing the appropriate tray 104–107. Then, the disk picker conveys the selected disk for use by reading and writing equipment of the drive, as discussed in greater detail below. The construction of a preferred embodiment of one of the trays 104–107 is described in greater detail in U.S. patent application Ser. No. 08/385,503, entitled "Single Disk Right Protection System For Multiple-disk Cartridge", in the name of Chi-Hung Dang, which was filed on Feb. 8, 1995; this application is hereby incorporated by reference in its entirety.

The cartridge 100 additionally has a pair of notches 116–117 defined along respective sides 120–121 of the cartridge 100. A reflective strip 118 is adhered to one side of the cartridge 100. In the illustrated embodiment, the strip 118 is shown adhered to the side 120. The reflective strip 118 preferably comprises silver-coated mylar or another suitable light-reflecting material.

Hardware for Conveying Disks

Figure 2:
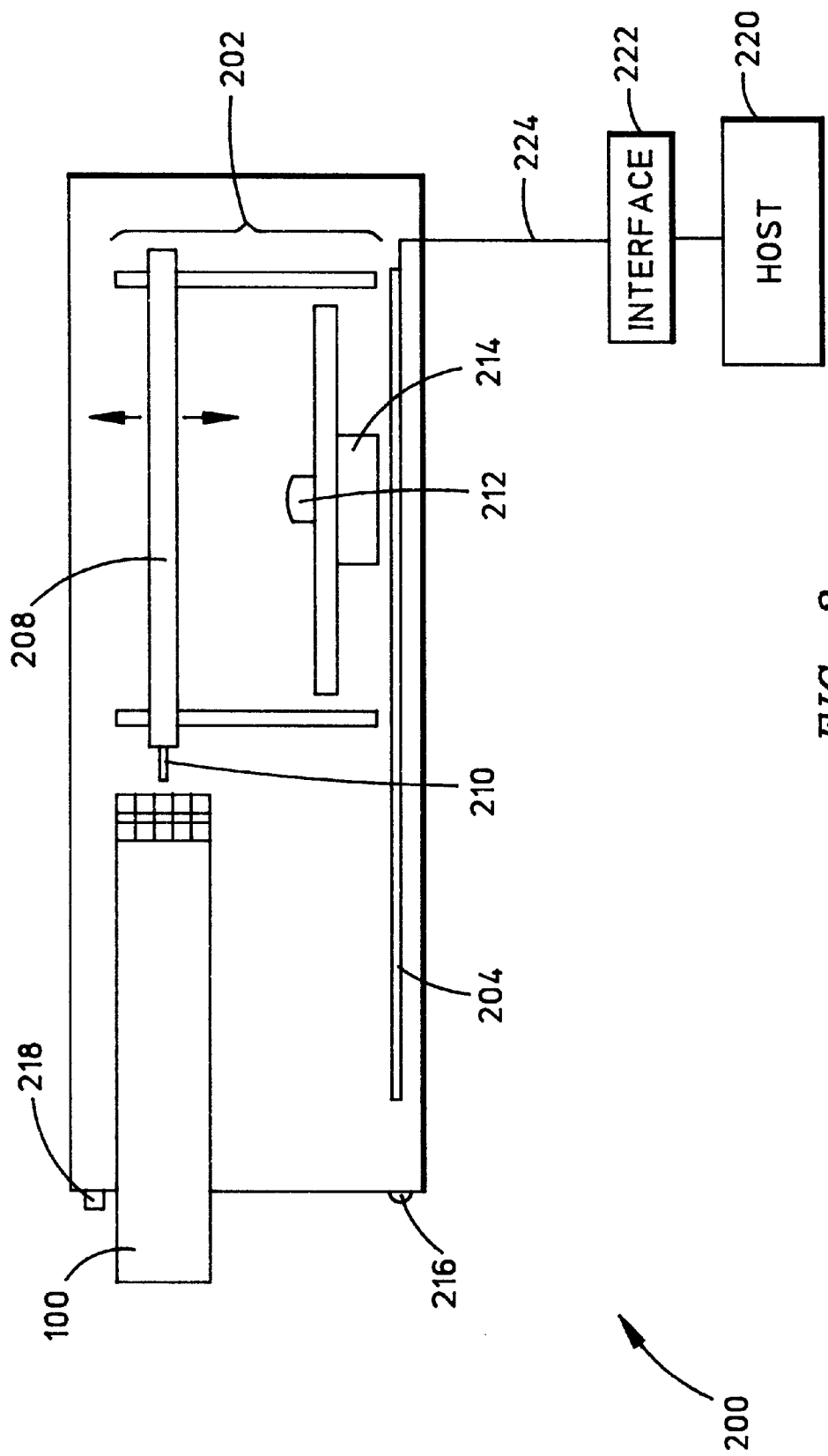
FIG. 2 is a side view of an illustrative user-operated hardware environment in which the present invention may be implemented.
Figure 3:
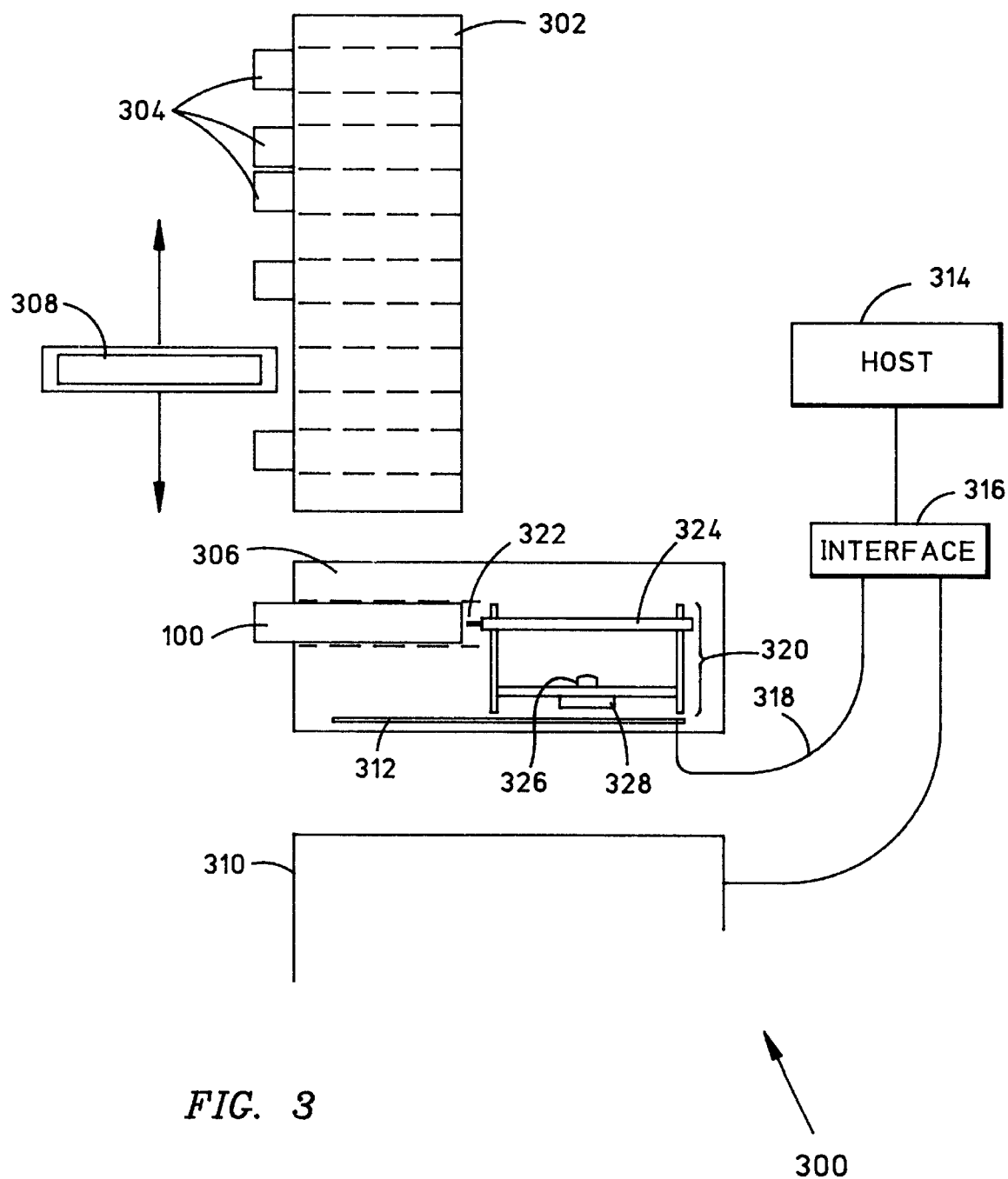
FIG. 3 is a side view of an illustrative machine-operated hardware environment in which the present invention may be implemented.

The present invention may be implemented in the form of a "user-operated" disk drive (FIG. 2) or in an automated disk "library" (FIG. 3). FIG. 2 depicts an example of the user-operated environment, in which a human user (not shown) inserts the cartridge 100 into an optical disk drive 200. The drive 200 includes a drive controller card 204 with circuitry for managing the drive's operation. The card 204 communicates electrically with a host computer 220, via an interface 222 and a bus 224. The interface 222, in an exemplary embodiment, may comprise a SCSI interface.

The drive 200 also includes a disk picker 202, which removes disks from the cartridge 100 and inserts disks back into the cartridge 100. Move specifically, disks are removed from the cartridge 100 by a gripper 210 that individually selects a tray containing the desired disk. Then, an elevator 208 lowers the disk onto a spindle 212 which is rotated by the motor 214 to spin the disk. The drive controller card 204 controls operation of the disk picker 202, the spindle 212, and the motor 214.

The drive 200 may include a busy LED 216 conveniently disposed on a front face of the drive 200. As an example, the busy LED 216 may be illuminated when a disk has been loaded on the spindle 212, or when the disk picker 202 is in the process of loading or unloading a disk. The face of the drive 200 also includes an unload button 218. The user must press the unload button 218 to remove the cartridge 100 from the drive 200 because, as discussed in greater detail below, the cartridge 100 may be locked into position in the drive 200.

In contrast to the user-operated embodiment of FIG. 2, the automated disk library environment is shown in FIG. 3. In this environment, a large bin 302 contains a plurality of cartridges 304, which are conveyed to a disk drive 306 by a library picker 308. The library picker 308 may also operate to distribute cartridges 304 to additional drives, such as a drive 310. The library picker 308 may comprise, for example, a robotic arm similar to that used in the IBM Model 3495 Tape Library System.

The drives 306 and 310 may comprise drives with similar components as the drive 200. For example, the drive 306 includes a drive controller card 312 that is electrically connected to a host computer 314 via an interface 316 and a bus 318. The drive 306 also includes a disk picker 320, a disk gripper 322, an elevator 324, a spindle 326, and a motor 328, similar to the components of the drive 200. However, in the automated disk library environment, the unload button 218 and busy LED 216 are not necessary because the cartridges 304 are inserted into and removed from the drive 306 by the library picker 308 rather than a human user. In substitution for the function of the unload button 218, the host 314 may issue an "unload" command to the drives 306 and 310, via the interface 316. Where there are multiple drives, the drives may be connected to the same host, as illustrated.

Disk Insertion and Locking Equipment

Figure 4:
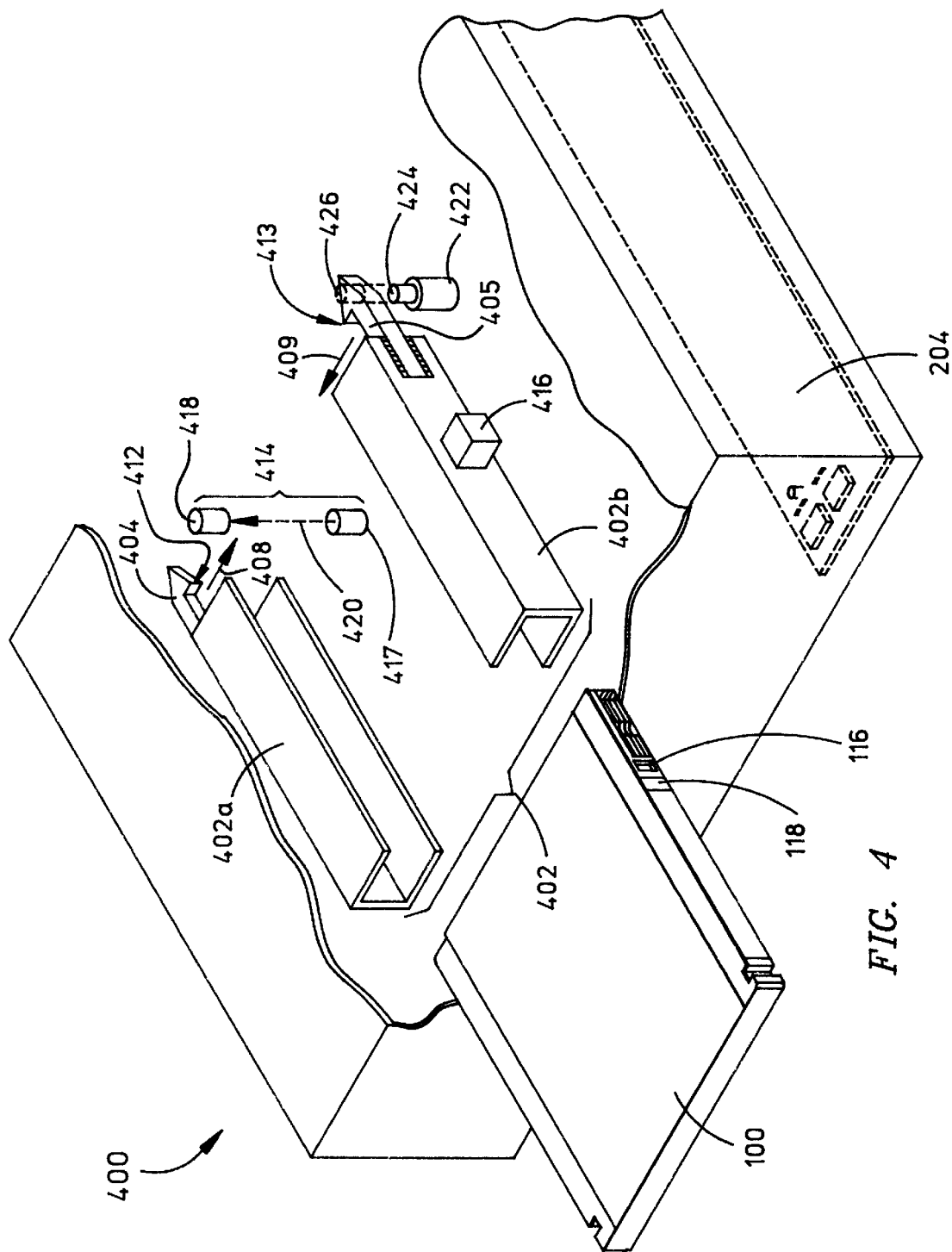
FIG. 4 is a partially cut-away perspective view of a disk drive in accordance with the present invention.

As shown in FIG. 4, the present invention includes certain equipment for detecting the proper insertion of a cartridge into a drive, and also for locking the cartridge in the drive during selected periods. The optical disk drive 400 of the invention, whether implemented in the form of the user-operated drive 200 (FIG. 2) or the drive 306 of an automated disk library (FIG. 3), includes various common components. In particular, the drive 400 includes a guide 402 for receiving a cartridge 100. The guide 402 preferably includes a pair of guide members 402a–402b, each of which includes respective latches 404–405. The latches 404–405 are resiliently urged inward, such as by spring-loading, in respective directions indicated by the arrows 408–409. Each latch 404–405 additionally defines an inwardly disposed catch 412–413. When a cartridge 100 is fully inserted into the guide 402, the catch 413 is received into the notch 116 (FIGS. 1A–1B). Additionally, the catch 412 is received into the notch 117 (FIG. 1A). Therefore, when the cartridge is fully inserted into the guide members 402a–402b, the cartridge 100 snaps into place due to the interaction between the latches 404–405 and the notches 116–117.

The drive 400 additionally includes a position sensor 414 for detecting whether a cartridge 100 has been inserted into the guide 402. Preferably the position sensor 414 comprises light emitting and detecting elements 417–418. The light emitting element 417, which preferably comprises a light emitting diode, passes a light beam 420 through a region where the cartridge 100 passes when it is fully inserted into the drive 400. The light detecting element 418 may comprise a photo transistor or a photo diode, for example. The elements 417–418 are electrically connected to the drive controller card 204, enabling the card 204 to detect whether a cartridge 100 has been inserted into the drive 400, i.e., by determining whether the light beam 420 is broken. In an alternative embodiment, the position sensor 414 may comprise a pressure transducer positioned appropriately to sense the presence of the cartridge 100.

In addition to the position sensor 414, the drive 400 additionally includes an orientation sensor 416. The orientation sensor 416 is disposed proximate the guide 402b, such that the sensor 416 is adjacent to the reflective strip 118 when the cartridge 100 is fully inserted into the guide 402. The orientation sensor 416 incorporates a light detecting element (not separately shown) that projects a beam of light (not shown) onto the reflective strip 118, and a light detecting element (not separately shown) that detects reflections of the projected light beam. The orientation sensor 416 is electrically connected to the drive controller card 204. Therefore, when the light detecting element senses a reflection of the projected beam, the drive controller card 204 recognizes that the cartridge 100 has been inserted into the guide 402 with the proper orientation. If the cartridge 100 is upside-down, for instance, the reflective strip 118 is adjacent to the guide 402a rather than the guide 402b, and the orientation sensor 416 projects its light beam against the side 121 of the cartridge 100, which is not light-reflective as discussed above. Therefore, the orientation sensor 416 does not detect any light being reflected by the reflective strip 118. In this condition, the position sensor 414 determines that the light beam 420 has been broken; thus, the drive controller card 204 recognizes that, although the cartridge 100 has been inserted, it has been inserted improperly.

The drive 400 additionally includes a locking mechanism 422. In a preferred embodiment, the locking mechanism 422 comprises an electrically-operated solenoid positioned near to the latch 405. The locking mechanism 422 is electrically connected to the drive controller card 204. When the locking mechanism 422 receives an appropriate electrical signal from the drive controller card 204, a locking pin extends from a recessed position 424 to a locking position 426 and prevents the latch 405 from resiliently moving in an opposite direction to the arrow 409. Therefore, when the cartridge 100 is fully inserted into the guide 402, the locking mechanism 422 effectively forces the catch 413 to remain in contact with the notch 116, thereby locking the cartridge 100 in place.

Preferably, the drive 400 also includes an ejector mechanism (not shown) to eject a cartridge 100 from the guide 402 for access by a user's hand or a library picker. The ejector mechanism may comprise, for example, a known motorized ejector.

General Operation

Figure 5:
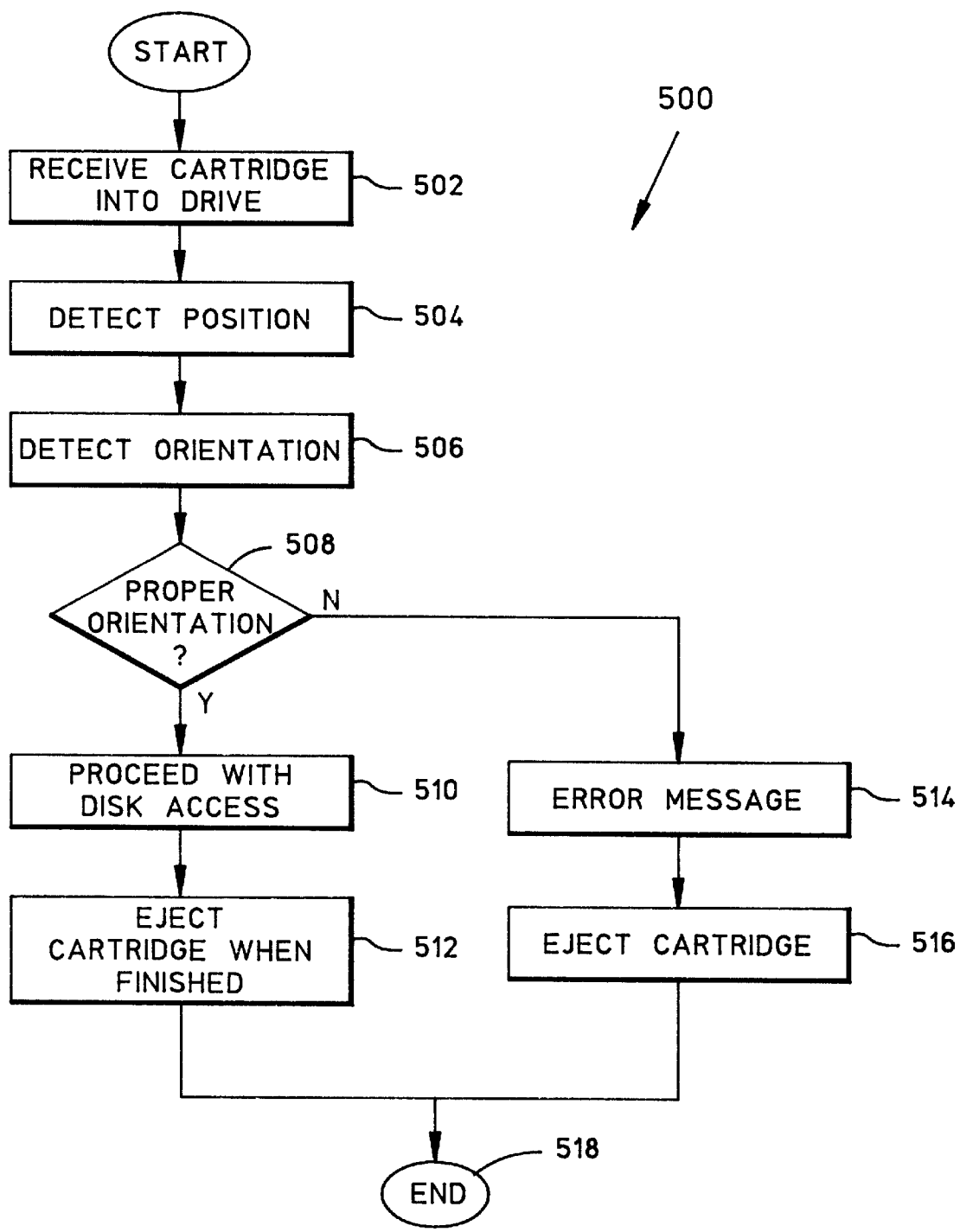
FIG. 5 is a flowchart of an illustrative positioning and orientation routine 500 of the invention.

In addition to the hardware devices discussed above, the present invention additionally contemplates a method for operating an optical disk drive with a multi-disk cartridge. In accordance with one aspect of the invention, FIG. 5 illustrates an exemplary sequence of tasks 500 for ensuring the proper insertion of a cartridge 100 into an optical drive. For ease of understanding, the tasks 500 will be illustrated in the context of a user-operated disk drive in accordance with FIGS. 1A–1B, 2, and 4. With several changes that will be apparent to those skilled in the art, tasks 500 may also be applied to an automated disk library such as that of FIG. 3.

The tasks 500 begin in task 502, where the drive 400 receives the cartridge 100. More specifically, as the cartridge 100 is slidably inserted between the guide member 402a–402b, the latches 404–405 resiliently move aside. As the cartridge 100 is inserted further, the catch 413 engages the notch 116 to snap the cartridge 100 in place. In task 504 the light beam 420 is broken, and the position sensor 414 sends a message to the card 204 to indicate that the cartridge 100 has been received by the guide 402.

Having determined that a cartridge has been inserted into the drive 400, task 506 determines whether the cartridge 100 is oriented properly. Namely, the orientation sensor 416 projects light beam against the side 120 of the cartridge 100, the strip 118 reflects the projected light, and the orientation sensor 416 detects the reflection. To minimize the consumption of electrical power, activation of the orientation sensor 416 may be limited to times when the position sensor 414 determines that a cartridge is present. After task 506, query 508 asks whether the cartridge 100 has the proper orientation. In particular, when the orientation sensor 416 detects the reflected light beam, this indicated that the reflective strip 118 is adjacent to the orientation sensor 416 and the cartridge 100 has been inserted properly. In this event, the drive 400 proceeds to access selected disks of the cartridge 100 in task 510. After task 510, the drive 400 in task 512 ejects the cartridge 100 when finished.

If query 508 determines that the cartridge 100 has been inserted improperly, the drive controller card 204 in task 514 generates an error message and transmits the message to the host 220. Then, the drive 400 ejects the cartridge 100 in task 516. After either of tasks 512 or 516 is executed, the routine 500 ends in task 518.

In accordance with the different aspect of the invention, a series of tasks 600 (FIG. 6) are provided for selectively locking a cartridge 100 into the drive 400. The tasks 600 are applicable both to a user-operated disk drive (as in FIG. 2) and an automated disk library (as in FIG. 3). First, the cartridge 100 is received into the drive 400 in task 602. Task 602 may include the steps of FIG. 5, for example. Next, in task 604 the drive 400 may conduct various operations, if desired. These operations may include communications between the drive controller card 204 and the host 220, as well as preparatory steps performed by the drive 200 prior to accessing data from one of the disks of the cartridge 100. Next, in task 606 the drive 400 activates the locking mechanism 422 to secure the cartridge 100 in position between the guide members 402a–402b. In the illustrated embodiment, this is achieved by the drive controller card 204 sending an appropriate electrical signal to the solenoid 422 to bring the locking pin into its extended (locking) position 426. Extension of the pin 426 prevents the latch 405 from disengaging the notch 116, and therefore locks the cartridge 100 in place.

Next, in task 608 the drive 200 conducts various operations. This may include, for example, removal of a disk from the cartridge 100, mounting the disk on the spindle 212, spinning-up the disk by the motor 214, and then reading and/or writing data to and from the selected disk. At an appropriate time, the drive controller card 204 deactivates the locking mechanism 422 in task 610, permitting the cartridge 100 to be removed from the guide 402. In task 612, the drive 400 may conduct further operations, if desired, such as performing further reads and writes to the selected disk mounted on the spindle 212. Or, if the disk has already been de-mounted and re-inserted into the cartridge 100, task 612 may involve operations internal to the drive 400 such as preparing to receive a different cartridge. In task 614, the ejector mechanism (not shown) ejects the cartridge from the drive 400. Finally, the routine 600 ends in task 616.

Figure 6:
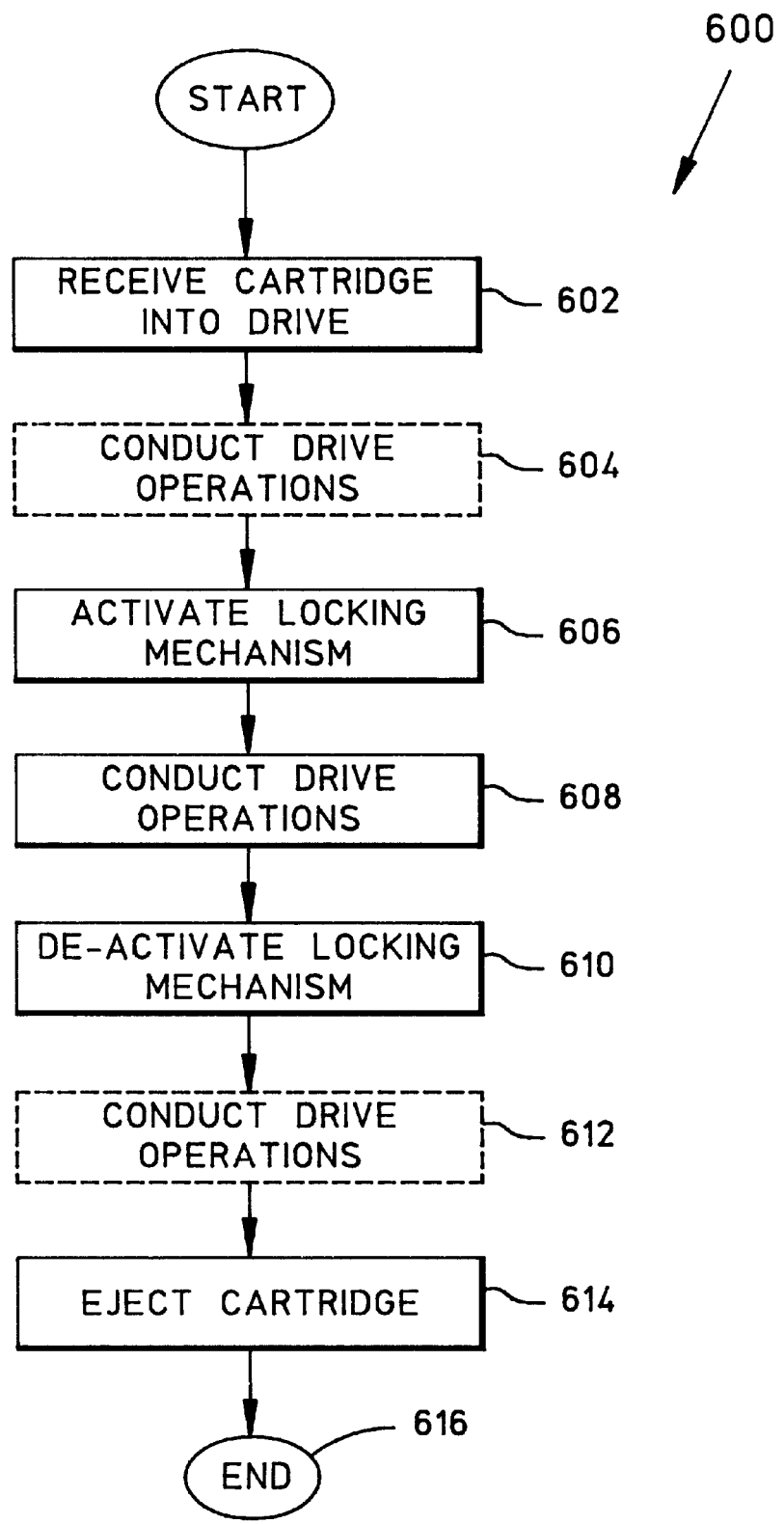
FIG. 6 is a flowchart of an illustrative locking routine 600 of the invention.

FIG. 6 broadly describes the operation of the locking mechanism 422, to accommodate many possible variations of operating the locking mechanism 422. For example, the drive 400 may automatically lock a cartridge 100 at all times when the cartridge 100 is inserted into the drive 400. Under this embodiment, tasks 604 and 612 are eliminated, since the cartridge 100 is always locked upon insertion, and automatically unlocked immediately prior to removal. In another embodiment, the drive 400 may lock the cartridge 100 in place at all times, unless the cartridge 100 is effectively "free" by virtue of a disk having been mounted on the spindle 212. In other words, when a disk of the cartridge 100 has been mounted on the spindle 212, the cartridge 100 may be removed from the drive 200 without affecting the mounted disk or the operation of the elevator 208. In this embodiment tasks 604 and 612 are also eliminated. However, task 608 includes the additional steps of unlocking the cartridge 100 when a disk has been mounted on the spindle 212. In another embodiment, the locking mechanism 422 locks the cartridge 100 only when the disk picker is inserting a disk into the cartridge 100 or removing a disk therefrom. In this embodiment, task 608 simply includes the steps of using the disk picker 202 to convey a disk from the cartridge 100 to the spindle 212.

The ability to operate the locking mechanism 422 at selected times when the cartridge 100 is inserted into the drive 400 is an important feature of the invention, because it permits the cartridge 100 to be removed at non-critical times during the operational cycle of the disk picker 202. This provides the present invention with a number of features that are especially beneficial, and unknown in the prior art. For example, since a cartridge 100 can be removed from the drive 400 after one of its disks has been mounted of the spindle 212, a different cartridge can be inserted into the drive 400 to subsequently receive the mounted disk. Therefore, the drive 400 can be used to transfer disks from one cartridge to another. These features are similarly applicable to the user-operated drive 200 and the library-operated drive 306.

Specific Implementation

To further illustrate the operation of the present invention, an exemplary operational sequence of the invention is discussed in detail below. These operational characteristics are applicable to both a user-operated disk drive (as in FIG. 2) and an automated disk library (as in FIG. 3). In this example, the drive controller card recognizes a number of specific commands transmitted by the host.

Mode Select Command

In a general sense, the host issues a MODE SELECT command to a drive to select a cartridge slot for extraction or insertion of a disk. More specifically, the MODE SELECT command is issued in the following format: "MODE SELECT XXX", where "XXX" comprises a binary "disk selection value" that identifies the desired cartridge slot. For example, the disk selection value of "001" corresponds to slot "A", the disk selection value of "010" corresponds to slot "B", and the disk selection value of "011" corresponds to slot "C". After the drive is first powered up, the disk selection value is set to "Null", or alternatively to 000. The disk selection value is also set to Null after a disk is re-inserted into the cartridge. Generally, the insertion of a cartridge into the drive causes the cartridge to be locked in the drive, after which the selected disk is extracted from the cartridge and mounted on the spindle. If the disk selection value is Null, however, the cartridge is still locked but no disk will be extracted.

If a disk selection value is set via the MODE SELECT command while a cartridge is locked in the drive, the selected disk is extracted from the cartridge and mounted. If a READ command is issued to a drive that has locked a cartridge in position but has not mounted a disk (i.e., disk selection value is set to Null), the disk selection value is automatically set to 001; as a result, the disk from slot "A" is extracted from the cartridge, the disk is mounted and spun-up, and a READ command is executed against the disk.

Alternatively, a different technique may be employed to select a cartridge slot for extraction or insertion of a disk, instead of using the MODE SELECT command. Namely, the present invention may employ an I/0 unit addressing convention such as that employed by the Disk Operating System ("DOS") of IBM Corporation. With the DOS convention, for example, the alphabetic designators "a:", "b:", "c:", and "d:" may designate a first diskette drive, a second diskette drive, a first conventional "hard drive", and a second conventional "hard drive". In this environment, the disk slots of cartridges inserted into optical drives may correspond to further alphabetic designators. In the present example, the disk slots of a first and second optical drives, for instance, may be associated with the alphabetic designators "e:", "f:", "g:", "h:", and "i:", "j:", "k:", "l:", respectively. To illustrate the following operational sequence of the invention, however, the MODE SELECT command is used.

Prevent/Allow Media Removal

Broadly, the host issues a PREVENT/ALLOW MEDIA REMOVAL command to a disk drive to control the insertion and removal of a cartridge and its disks. This command also determines the effect of the unload button 218, and the effect on the library picker 308 of an "unload" order from the host 314. More specifically, the host issues a PREVENT/ ALLOW MEDIA REMOVAL command in the following format: "PREVENT/ALLOW MEDIA REMOVAL XX", where "XX" comprises a binary OPTION designator ranging from 00 to 11.

OPTION 00 allows a drive, in response to certain events, to spin-down a currently-mounted disk, to de-mount the disk, to re-insert the disk into a cartridge present in the drive, and to unlock the cartridge. These events include (1) issuance of a START/STOP UNIT command (OPTION 10) from a user-operated drive's host 220 or a library host 340, (2) a user's activation of the unload button 218, and (3) issuance of an "unload" order from the interface 316 of a library host 314. The START/STOP UNIT command is described in greater detail below. In this mode of operation, the cartridge may be removed from the drive at any time, except when a disk is being extracted or inserted. OPTION 01 prevents certain events from causing a drive to spin-down a currently-mounted disk, de-mount the disk, insert the disk into a cartridge present in the drive, and unlock the cartridge. These forestalled events include (1) the issuance of a START/STOP UNIT command (OPTION 10) from a user-operated drive's host 220 or a library host 340, (2) a user's activation of the unload button 218, and (3) issuance of an "unload" order from the interface 316 of a library host 314. OPTION 10 prevents a drive from spinning-down a currently-mounted cartridge, de-mounting the disk, and inserting the disk into the cartridge present in the drive, except in certain cases. Namely, this option permits the drive to unlock the cartridge in response to: (1) issuance of a START/STOP UNIT command (OPTION 10) from a user-operated drive's host 220 or a library host 340, (2) a user's activation of the unload button 218, or (3) issuance of an "unload" order from the interface 316 of a library host 314. OPTION 11 permits a drive to spin-down a currently-mounted disk, de-mount the disk, and insert the disk into a cartridge present in the drive. OPTION 11, however, prevents unlocking of the cartridge in response to (1) issuance of a START/STOP UNIT command (OPTION 10) from a user-operated drive's host 220 or a library host 340, (2) a user's activation of the unload button 218, or (3) issuance of an "unload" order from the interface 316 of a library host 314.

Start/Stop Unit

The START/STOP UNIT command generally controls the spin-up and spin-down of disks, as well as the loading and unloading of the disks. The START/STOP UNIT command is issued in the following format: "START/STOP UNIT XX", where "XX" comprises a binary OPTION designator ranging from 00 to 11. OPTION 00 spins a disk down and leaves the disk mounted on the spindle. OPTION 01 spins up a disk that is already mounted on the spindle. OPTION 10 spins down a disk, de-mounts the disk from the spindle, re-inserts the disk into an appropriate slot of the cartridge present in the drive, and unlocks the cartridge. OPTION 11 mounts a disk to the spindle and spins up the disk. Additional features of the START/STOP UNIT command may be developed by an ordinarily skilled artisan with the benefit of this disclosure, or may be taken from aspects of the START/ STOP UNIT commands that are currently used in IBM products.

Operational Scenario

Figure 7A:
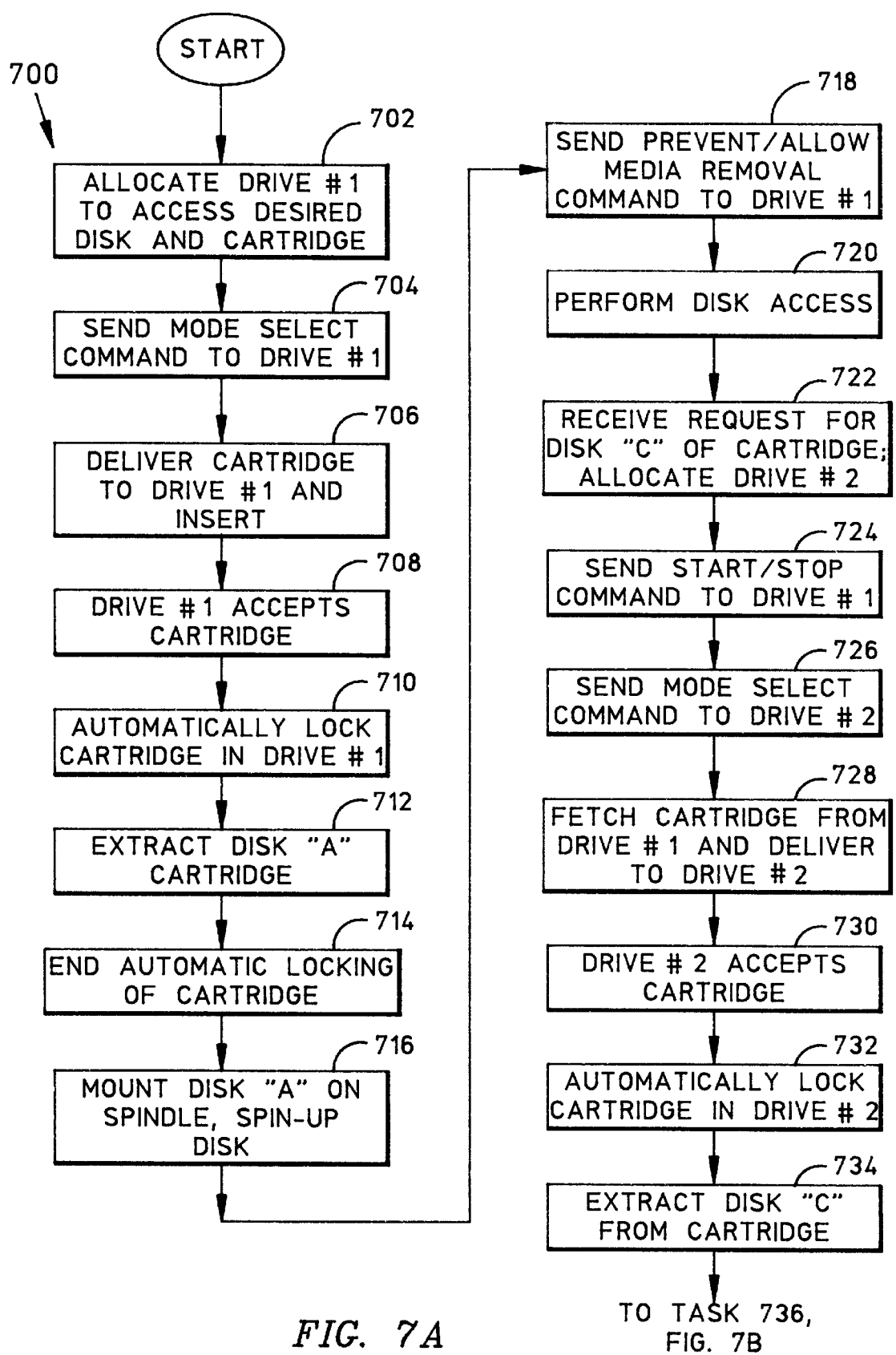
FIGS. 7A–7C contain a detailed flowchart of an illustrative operational sequence in accordance with the invention.
Figure 7B:
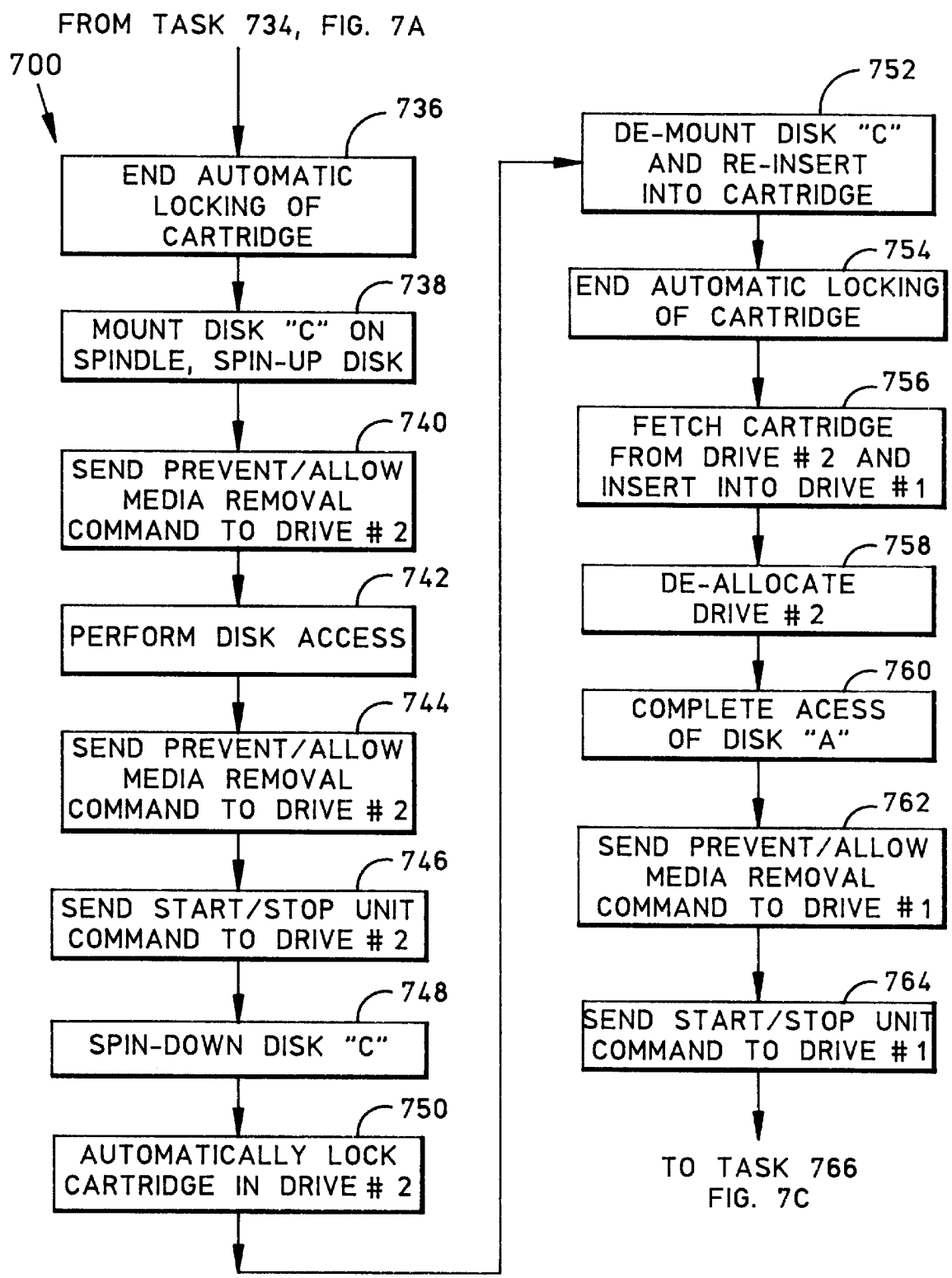
Figure 7C:
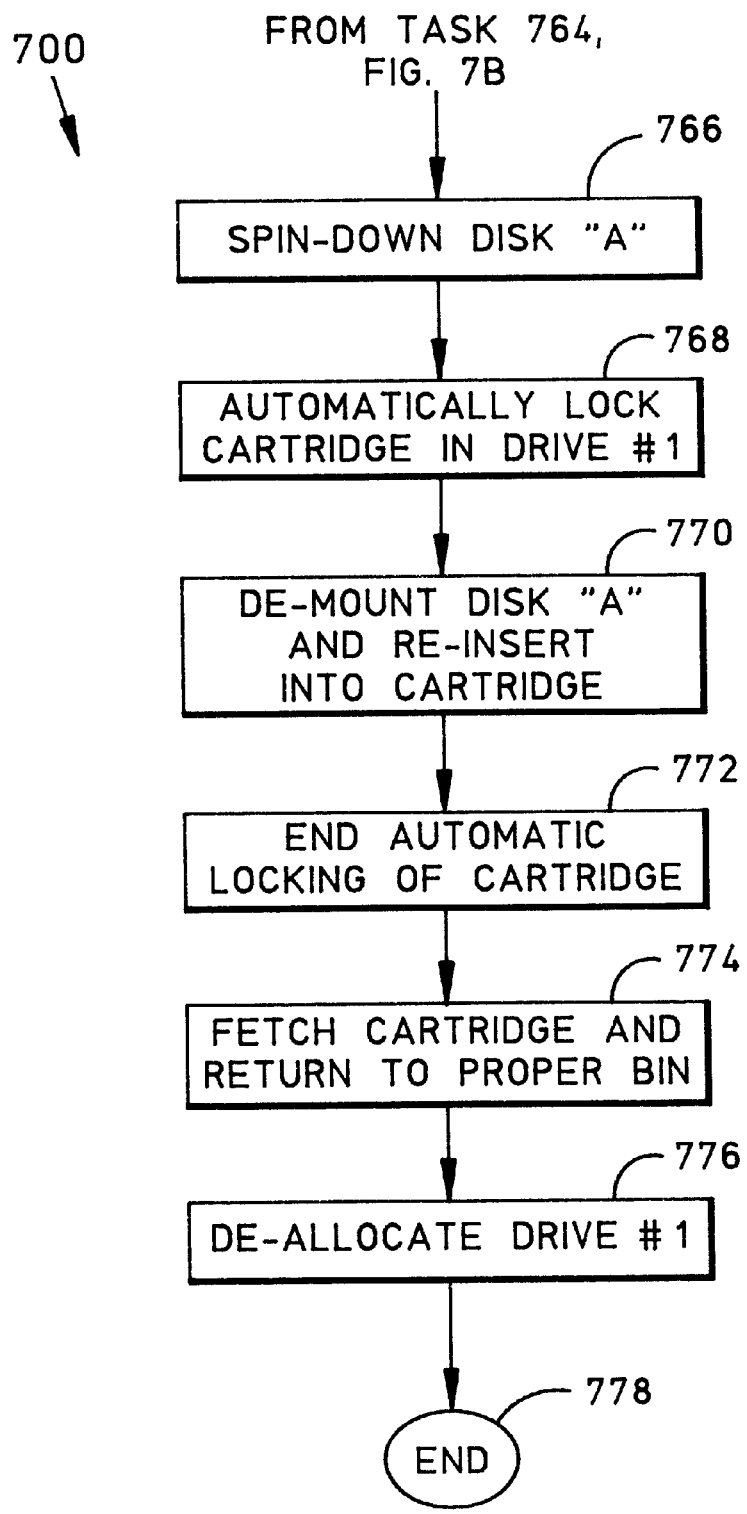

FIGS. 7A–7C illustrate a specific sequence of operation to further illustrate the present invention. For ease of illustration, this sequence refers to the automated disk library of FIG. 3, where each drive 306, 310 includes the components of FIG. 4. In this sequence, a cartridge 100 in inserted into the drive 306, which removes and mounts a selected disk from the cartridge 100. In the illustrated embodiment, the disk is removed from slot "A" of the cartridge 100. Then, the cartridge 100 is removed from the drive 306 and inserted into the drive 310, while the disk remains mounted in the drive 306. The drive 310 removes a different disk from the cartridge 100 and mounts it. In the illustrated embodiment, this disk is removed from slot "C" of the cartridge 100. After the drive 310 subsequently re-inserts its disk into slot "C" of the cartridge 100, the cartridge 100 is removed and re-inserted into the drive 306. Finally, the first disk is re-inserted into slot "A" of the cartridge 100, the cartridge 100 is removed from the drive 306, and the sequence ends.

These steps are shown in greater detail by the routine 700 of FIGS. 7A–7C. The routine 700 begins in task 702, in which the host 314 "allocates" the drive 306 for access of a specific disk, which is contained in a particular cartridge 100 to be received by the drive 306. This specific disk is selected by the host 314 in accordance with the data requirements of an operator (not shown), from whom the host 314 is accessing certain data maintained by the host. In many cases, the operator may not be aware of the specific storage locations (e.g. which disk, and which cartridge) for data that the operator requests. This operator, may comprise a human operator, or a master computer such as a mainframe or a personal computer.

The allocation of task 702 concerns certain "housekeeping" performed by the host 314. In particular, the host 314 allocates a portion of its memory (not shown) to represent, in advance, the fact that the drive 306 will soon be accessing a particular disk. In the illustrated example, the host 314 in task 702 stores information in its memory to indicate that the drive 306 will soon mount a specific disk; in this example, memory of the host 314 indicates that this disk is presently contained in slot "A" of a certain cartridge whose location in the bin 302 is specifically known to the host 314.

Next, in task 704 the host 314 sends the drive controller card 312 of the drive 306 a MODE SELECT (disk selection value=001) command to designate the disk contained in slot "A" for removal. In task 706, the cartridge 100 is delivered to the drive 306 and inserted into that drive. In the illustrated embodiment, task 706 is performed by the library picker 308. In an alternative embodiment (corresponding to FIG. 2), the cartridge 100 is delivered to the drive 200 by the user's hand rather than the library picker 308. In task 708, the drive 306 accepts the cartridge 100; this task may include, for example, verifying the presence and correct orientation of the cartridge 100 in accordance with FIG. 5.

In the presently illustrated embodiment, each drive 306, 310 automatically locks a cartridge in place while a disk is being extracted from the cartridge 100 or re-inserted back into the cartridge 100. Accordingly, prior to extracting the slot "A" disk from the cartridge in task 712, task 710 automatically locks the cartridge 100 in place in the drive 306. This is performed, as described above, by the drive controller card 312 sending an electrical signal to the solenoid 422 causing the pin to rise to its extended position 426, forcing the catch 413 into locking engagement with the notch 116. During automatic locking of the cartridge 100, the drive 306 is not responsive to any START/STOP UNIT commands that the host 314 might issue in an attempt to unlock the cartridge 100. While the cartridge 100 is locked in place, the drive 306 extracts the slot "A" disk from the cartridge 100 in task 712. In task 714, automatic locking of the cartridge 100 ends; rather than physically unlocking the cartridge, this task ends mandatory locking of the cartridge 100, making the drive 306 responsive to any START/STOP UNIT commands that the host 314 might issue to unlock the cartridge 100 from the drive 306. Next, the elevator 324 in task 716 mounts the slot "A" disk on the spindle 212 and the motor 328 spins-up the disk.

In task 718 the host 314 sends the drive controller card 312 of the drive 306 a PREVENT/ALLOW MEDIA REMOVAL command in accordance with OPTION 10. Namely, this prevents de-mounting of the disk but allows unlocking of the cartridge 100. In task 720, the drive 306 performs various accesses to the disk, such as reading and writing data from and to the disk.

In task 722 the host 314 receives a request for certain data, known by the host 314 to be located on the disk in slot "C" of the cartridge presently inserted into the drive 306. Accordingly, since the drive 306 is busy accessing the disk from slot "A" of the cartridge 100, the host 314 "allocates" its memory to prepare for access of the slot "C" disk by the drive 310. Even though the slot "C" disk of the cartridge mounted in the drive 306 is required in another drive, the host can nonetheless initiate reading/writing of the disk in the drive 306. Accordingly, the host 314 in task 724 sends a START/STOP UNIT command (OPTION 01) to the drive 306, to spin-up the disk mounted therein.

Then, the host 314 in task 726 sends a MODE SELECT (disk selection value=011) command to the drive 310, signalling that the drive 310 should extract the slot "C" disk when the drive 310 receives the cartridge 100. The library picker 308 then fetches the cartridge 100 from the drive 306 and delivers it to the drive 310 in task 728. In task 730 the library picker 308 inserts the cartridge into the drive 310 and the drive 310 accepts the cartridge 100. In task 732, the drive 310 automatically locks the cartridge 100 in place prior to performing task 734, which extracts the slot "C" disk from the cartridge 100. In task 736, automatic locking of the cartridge 100 ends, and the drive 310 in task 738 mounts the slot "C " disk and spins-up the disk.

In task 740 the host 314 sends the drive controller card of the drive 310 a PREVENT/ALLOW MEDIA REMOVAL command. This command is sent in accordance with OPTION 10, to prevent demounting of the disk but permit removal of the cartridge 100. Then, the drive 310 in task 742 accesses the disk by reading and writing data from and to the disk. After the drive 310 is finished with its access of the disk, the host 314 in task 744 sends a PREVENT/ALLOW MEDIA REMOVAL command to the drive 310 in accordance with OPTION 00. This option permits demounting of the disk from the drive 310 and removal of the cartridge 100 therefrom.

After task 744, the host 314 in task 746 sends a START/STOP UNIT command (OPTION 10) to the drive 310. Accordingly, the drive 310 in task 748 spins-down the disk. Then, prior to de-mounting the disk in task 752, the drive 310 in task 750 automatically locks the cartridge 100 in place. The drive 310 in task 752 then de-mounts the disk and re-inserts the disk into slot "C" of the cartridge 100. This slot is identified for this operation by the MODE SELECT command that was sent to the drive 310 in task 726. In task 754 the drive 310 ends automatic locking of the cartridge 100.

Next, the library picker 308 in task 756 fetches the cartridge 100 from the drive 310 and inserts the cartridge 100 into the drive 306. In task 758, the host 314 de-allocates the drive 310. In this step, the host 314 changes its representation of the drive 310 in memory to indicate that the drive 310 no longer houses the cartridge 100 and can receive another cartridge. Task 760 shows the drive 306 completing any remaining read and write operations of the disk mounted therein. Of course, if the remaining drive 306 has previously completed its access to the disk, task 760 is omitted.

The host 314 in task 762 then sends a PREVENT/ALLOW MEDIA REMOVAL command to the drive 306. This command is sent in accordance with OPTION 00, to allow de-mounting of the disk and removal of cartridge 100. In task 764, the host 316 sends the drive controller card 312 of the drive 306 a START/STOP UNIT command (OPTION 10). Accordingly, task 766 spins-down the disk and task 768 automatically locks the cartridge in the drive 306 during disk re-insertion. The drive 306 in task 770 de-mounts the disk and re-inserts it into slot "A" of the cartridge 100. This slot is identified in accordance with the MODE SELECT command that was sent to the drive 306 in task 704.

In task 772, the drive 306 ends automatic locking of the cartridge 100. The library picker 308 in task 774 then fetches the cartridge 100 and returns it to an appropriate bin 302. In task 776, the host 314 de-allocates the drive 306, and the routine 700 ends in task 778.

Initial Program Load

Figure 8:
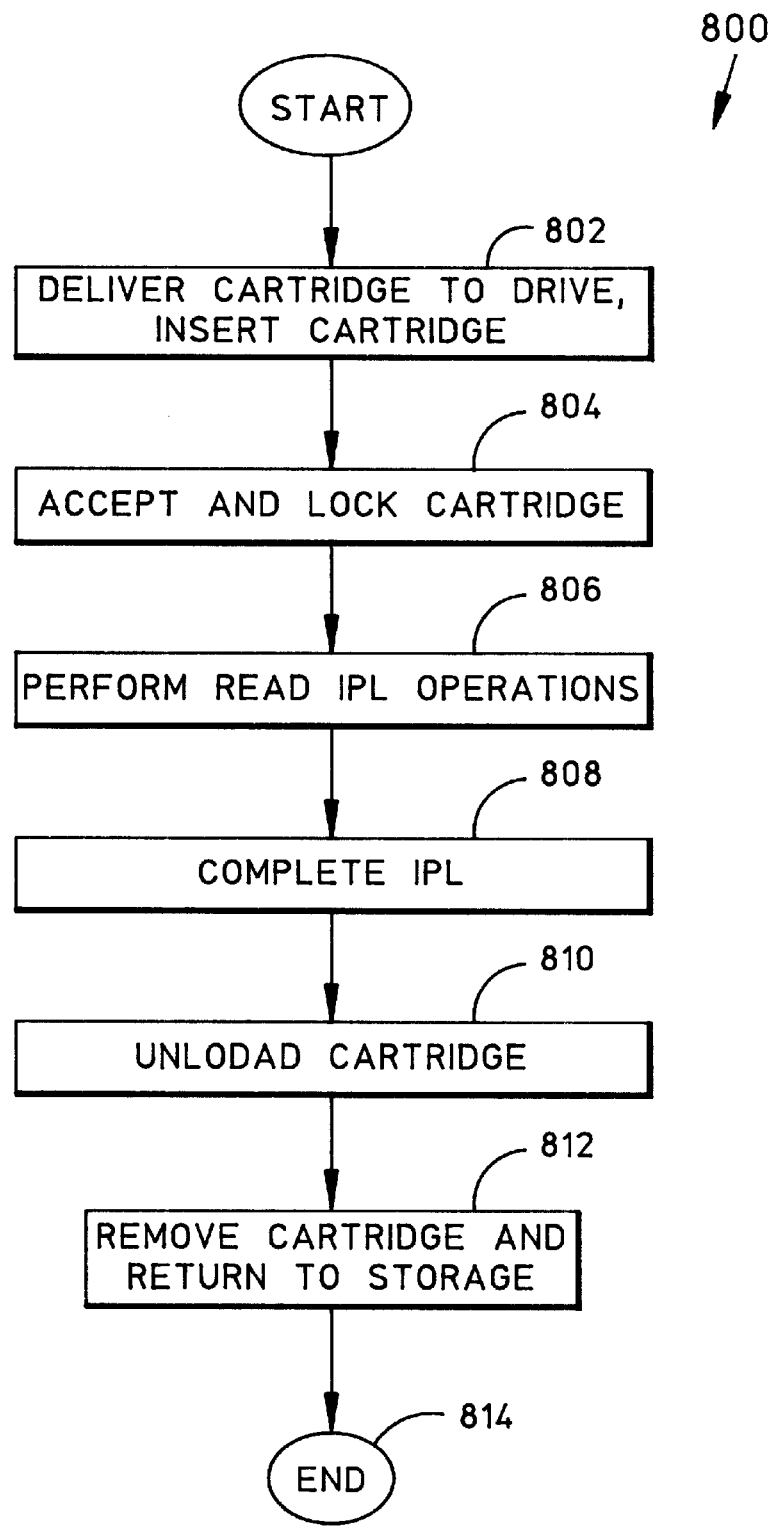
FIG. 8 is a flowchart of an illustrative initial program loading routine 800 of the invention.

FIG. 8 depicts an illustrative embodiment of an initial program load ("IPL") routine 800, in which a selected disk from a multi-disk cartridge may be used to "boot-up" a computer. To boot-up an IBM-compatible computer, one known method is to insert a floppy or rigid diskette into a corresponding drive of the computer and then apply power to the computer. In this situation, the computer is pre-programmed to perform its boot-up routine in accordance with instructions found on the diskette. With the multi-disk cartridges, however, booting-up a computer from a diskette is complicated in at least one respect. In particular, with a multi-diskette cartridge inserted into a data drive of the computer, the computer may be booted-up with the instructions contained on any one or more disks of the inserted cartridge. The IPL routine 800, as discussed below, overcomes this problem by designating, in advance, a particular disk of the multi-disk cartridge to be used for boot-up purposes.

The IPL routine 800 begins in task 802, where a cartridge 100 is delivered to the drive 400 and inserted into the drive 400. Task 802 may be performed by a library picker 308 in an automated disk library (FIG. 3), or by a human operator in a user-operated drive 200 (FIG. 2). Next, in task 804 the drive 400 verifies the correct positioning and orientation of the cartridge 100, and then locks the cartridge 100 in place. Next, the drive 400 in task 806 performs a number of READ IPL operations. If the host has previously sent the drive 400 a MODE SELECT command, the drive 400 in task 806 extracts the disk designated by the MODE SELECT command. Otherwise, the drive 400 extracts a "default" disk from the cartridge 100, mounts the disk on the spindle 212, and spins-up the disk. In an exemplary embodiment, the default disk may comprise a predetermined disk such as the disk in the "A" slot of the cartridge 100.

After the disk is spun-up in task 806, the drive 400 in task 808 completes the IPL operations. Namely, the host completes its boot-up process in accordance with instructions provided on the disk mounted in drive 400. After the host is booted-up, task 810 unloads the cartridge 100 from the drive 400. Also in task 810, the drive 400 spins down the disk, de-mounts the disk, inserts the disk back into the appropriate slot of cartridge 100, and unlocks the cartridge 100. Then, the cartridge 100 is removed from the drive 400 in task 812, and returned to an appropriate storage location. In the user-operated environment of FIG. 2, for example, these steps are performed by a human operator. Finally, the routine 800 ends in task 814.

Storing Files Across Disk Boundaries

In accordance with another aspect of the invention, the multi-disk optical cartridge of the invention may be advantageously employed to store files that reside on multiple disks of the same cartridge. For instance, an "application" file or a "data" file may be stored on a first disk, and overlapping onto a second disk. In one implementation, the cartridge may be used to provide a data file or an application file for a program that is being executed by the host. An application file contains computer-executable instructions to perform some task, whereas a data file simply contains data for use by an application file of some sort.

Figure 9A:
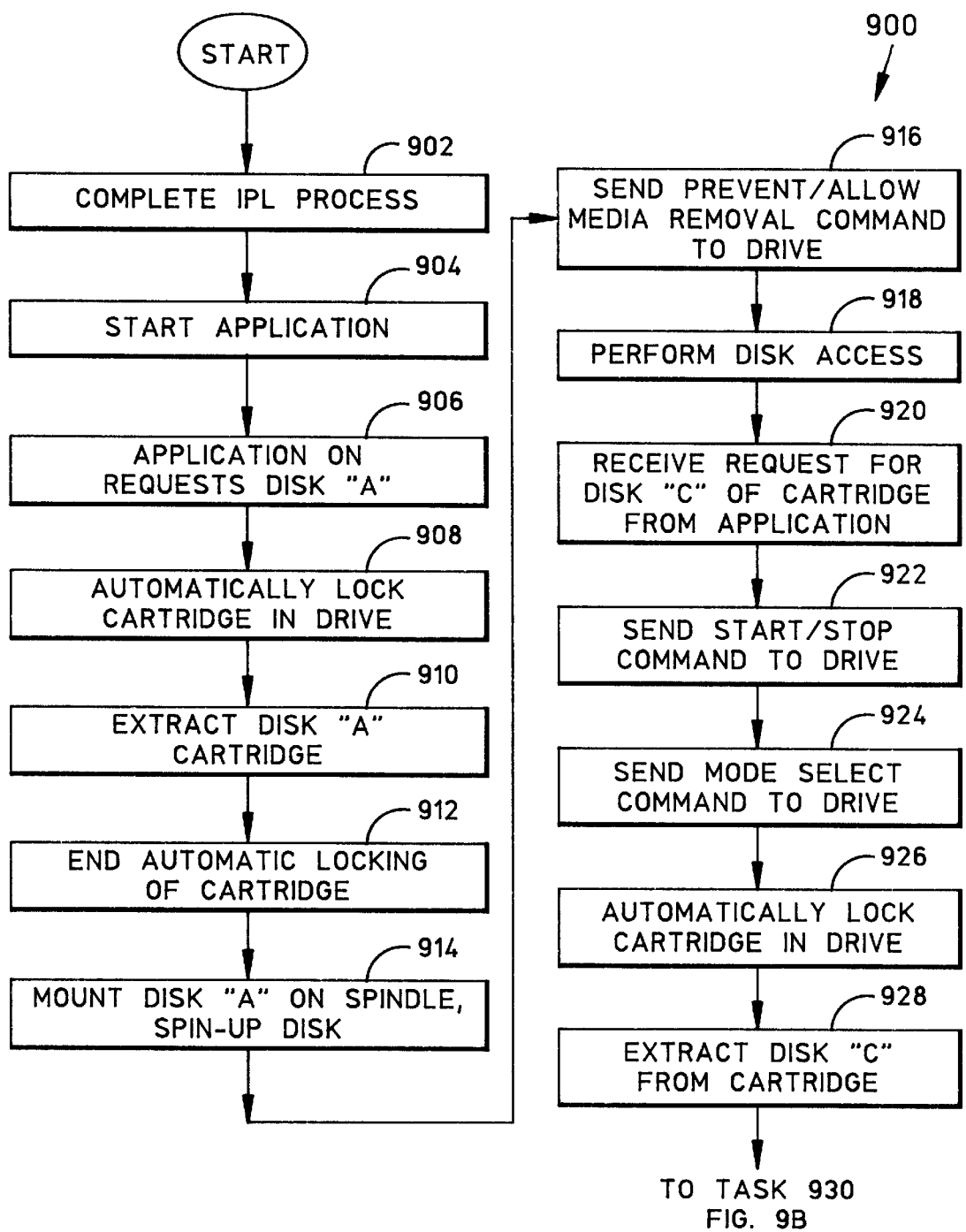
FIGS. 9A–9B contain a flowchart of an illustrative routine 900 for operating an optical disk to access files that reside across disk boundaries.
Figure 9B:
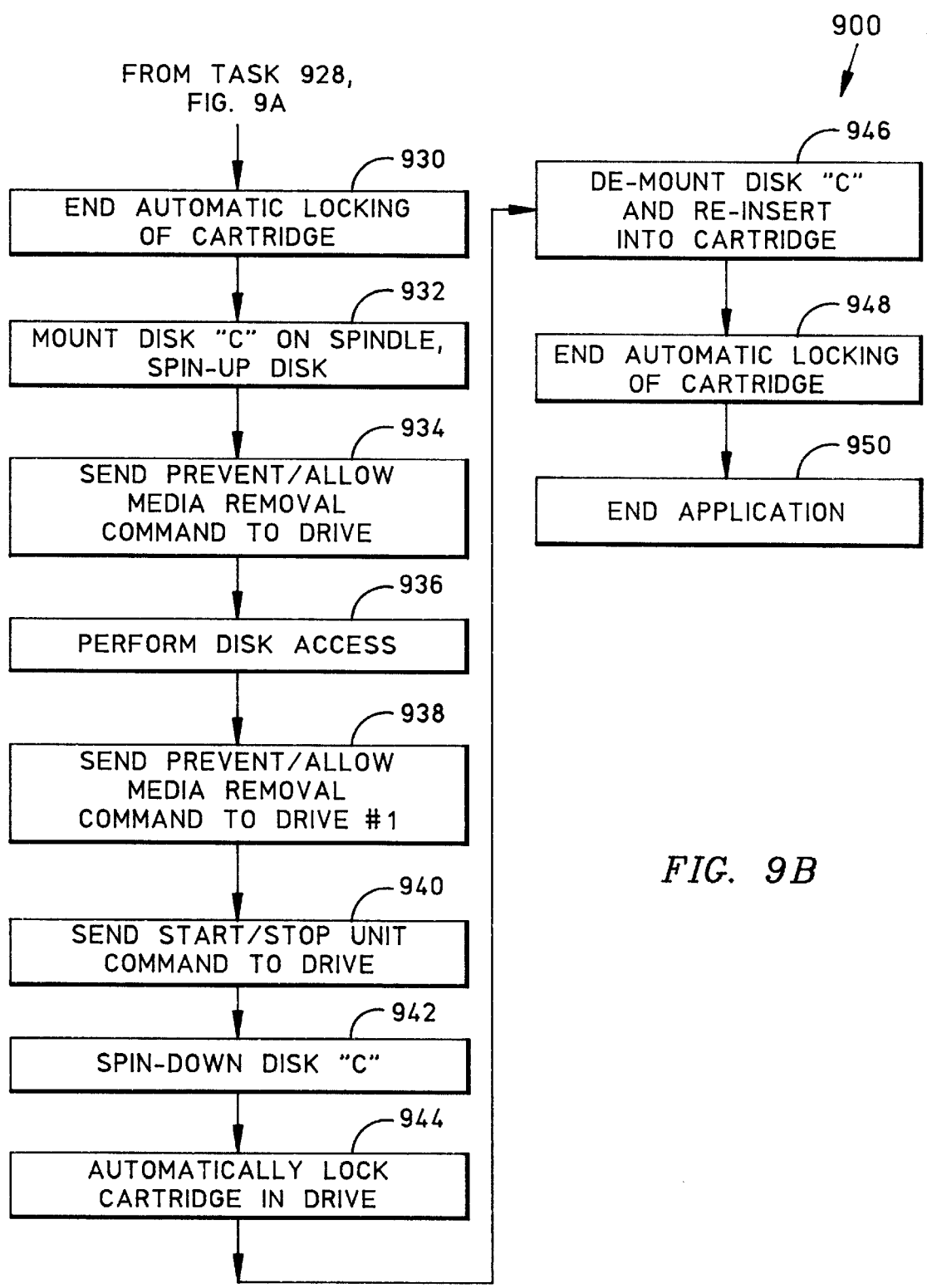

FIGS. 9A–9B illustrate a specific sequence of operation to further illustrate this aspect of the present invention. For ease of illustration, this sequence refers to the automated disk library environment of FIG. 3, where each drive 306, 310 includes the components of FIG. 4. In this sequence, a cartridge 100 in inserted into the drive 306, which removes and mounts selected disks, containing an overlapping file, from the cartridge 100. In the illustrated embodiment, a first disk is removed from slot "A" of the cartridge 100. Then, when the application program completes its access to the slot "A" disk, the drive 306 re-inserts the slot "A" disk back into the cartridge 100 and removes and mounts a different disk, to which the data overlaps. In the illustrated embodiment, this disk is removed from slot "C" of the cartridge 100. After access is completed to this disk, the drive 306 re-inserts the disk into the cartridge 100, the cartridge 100 is removed from the drive 306, and the sequence ends.

These steps are shown in greater detail by the routine 900 of FIGS. 9A–9B. The routine 900 begins after the cartridge 100 is properly inserted and received (FIG. 5) into the drive 306. As an example, the routine 900 may begin by completing the IPL routine 800 of FIG. 8, as shown by task 902. In the illustrated embodiment, the "boot-up" performed in task 902 causes the host 314 to initiate an application program, as shown by task 904. Subsequently, in the course of executing the application program, the host 314 requests information stored on a particular disk contained in the cartridge 100. In the present example, this disk comprises the disk in slot "A" of the cartridge 100.

In response to the host's request for the slot "A" disk, task 908 is performed. Prior to extracting the slot "A" disk from the cartridge in task 910, the drive 306 in task 908 automatically locks the cartridge 100 in place. This is performed, as described above, by the drive controller card 312 sending an electrical signal to the solenoid 422 causing the pin to rise to its extended position 426, forcing the catch 413 into locking engagement with the notch 116. During automatic locking of the cartridge 100, the drive 306 is not responsive to any START/STOP UNIT commands that the host 314 might issue in an attempt to unlock the cartridge 100. While the cartridge 100 is locked in place, the drive 306 extracts the slot "A" disk from the cartridge 100 in task 910. In task 912, automatic locking of the cartridge 100 ends; rather than physically unlocking the cartridge, this task ends mandatory locking of the cartridge 100, making the drive 306 responsive to any START/STOP UNIT commands that the host 314 might issue to unlock the cartridge 100 from the drive 306. Next, the elevator 324 in task 914 mounts the slot "A" disk on the spindle 212 and the motor 328 spins-up the disk.

In task 916 the host 314 sends the drive controller card 312 of the drive 306 a PREVENT/ALLOW MEDIA REMOVAL command in accordance with OPTION 10. Namely, this prevents a de-mounting of the disk but allows unlocking of the cartridge 100. In task 918, the drive 306 performs various accesses to the disk, such as reading and writing data from and to the disk.

When the application program performed by the host 314 is using a file on the slot "A" disk that laps over onto the slot "C" disk, for example, and the application program completes its access to the slot "A" portion of the file and accordingly needs the slot "C" portion of the file, the application program submits a request to the host 314 for the slot "C" disk. Accordingly, in task 920 the host 314 receives a request for access to the slot disk "C" of the cartridge 100. In response, the host 314 sends a START/STOP UNIT command (OPTION 01) to the drive 306. Then, the host 314 in task 924 sends a MODE SELECT 011 command to the drive 306 to designate the slot "C" disk for extraction from the cartridge 100.

In task 926, the drive 306 automatically locks the cartridge 100 in place prior to performing task 928, which extracts the slot "C" disk from the cartridge 100. In task 930, automatic locking of the cartridge 100 ends, and in task 932 the drive 306 mounts the slot "C" disk and spins-up the disk.

In task 934 the host 314 sends the drive controller card 312 of the drive 306 a PREVENT/ALLOW MEDIA REMOVAL command. This command is sent in accordance with OPTION 10, to prevent demounting of the disk but permit removal of the cartridge 100. Then, the drive 306 in task 936 accesses the slot "C" disk by reading and writing data from and to the disk. When the application program has finished accessing the slot "C" disk, the host 314 in task 938 sends a PREVENT/ALLOW MEDIA REMOVAL command to the drive 306 in accordance with OPTION 00. This option permits demounting of the disk from the drive 306 and removal of the cartridge 100 therefrom.

After task 938, the host 314 in task 940 sends a START/STOP UNIT command (OPTION 10) to the drive 306. Accordingly, the drive 306 in task 942 spins-down the slot "C" disk. Then, prior to de-mounting the disk in task 946, the drive 306 task 944 automatically locks the cartridge 100 in place. The drive 306 in task 946 then de-mounts the disk and re-inserts the disk into slot "C" of the cartridge 100. In task 948 the drive 306 ends automatic locking of the cartridge 100, and the routine ends in task 950.

While there have been shown what are presently considered to be preferred embodiments of the invention, it will be apparent to those skilled in the art that various changes and modifications can be made herein without departing from the scope of the invention as defined by the appended claims.

What is claimed is:

1. A method for operating a library of multi-disk cartridges, said library including multiple disk drives and a cartridge picker to exchange multi-disk cartridges between the disk drives, each disk drive including a respective disk picker, said method comprising:
    a first step of operating the cartridge picker to load a first multi-disk cartridge in a first one of the disk drives;
    a second step of operating a first disk picker in the first disk drive to exchange a first selected disk with the first multi-disk cartridge;
    a third step of operating the cartridge picker to unload the first multi-disk cartridge from the first disk drive;
    a fourth step of operating the cartridge picker to load the first multi-disk cartridge in a second one of the disk drives; and
    a fifth step of operating a second disk picker in the second disk drive to exchange a second selected disk with the first multi-disk cartridge.

2. The method of claim 1, the library being coupled to a user console, the first through fifth steps being performed in response to user commands received from the console.

3. The method of claim 1, the library being coupled to a host computer, the first through fifth steps being performed in response to commands received from the host computer.

4. The method of claim 1, the second step comprising the steps of:
    operating the first disk picker in the first disk drive to retrieve the first selected disk from the first multi-disk cartridge and to mount the first selected disk in the first disk drive.

5. The method of claim 1, the fifth step comprising the steps of:
    operating the second disk picker in the second disk drive to retrieve the second selected disk from the second multi-disk cartridge and to mount the second selected disk in the second disk drive.

6. The method of claim 1, the second step comprising the steps of:
    operating the first disk picker in the first disk drive to retrieve the first selected disk from the first disk drive and to insert the first selected disk into the first multi-disk cartridge.

7. The method of claim 1, the fifth step comprising the steps of:
    operating the second disk picker in the second disk drive to retrieve the second selected disk from the second disk drive and to insert the second selected disk into the multi-disk cartridge.

8. The method of claim 1, wherein the library includes a storage bin having a plurality of compartments, and the method further includes steps of:
    a sixth step of operating the cartridge picker to unload the first multi-disk cartridge from the second disk drive; and
    a seventh step operating the cartridge picker to load the first multi-disk cartridge into a compartment of the storage bin.

9. The method of claim 1, the library including a storage bin having multiple compartments, the first step comprising the steps of:
    operating the cartridge picker to remove the first multi-disk cartridge from a compartment of the storage bin; and
    operating the cartridge picker to load the first multi-disk cartridge into the first one of the disk drives.

10. The method of claim 1, the first and second steps including the steps of:
    slidably receiving the first multi-disk cartridge into a cartridge guide of the first disk drive;
    locking the cartridge in place with the cartridge fully inserted into the cartridge guide; and
    using the first disk picker to exchange a selected disk with the first multi-disk cartridge while the first multi-disk cartridge is inserted into the cartridge guide.

11. The method of claim 10, wherein the first multi-disk cartridge is locked in place continuously when the first multi-disk cartridge is fully inserted into the cartridge guide, and the third step includes a step of unlocking the first multi-disk cartridge in response to a request to remove the cartridge from the cartridge guide.

12. The method of claim 11, wherein the request to remove the cartridge from the cartridge guide is received from a human user via a console attached to the library.

13. The method of claim 11, wherein the request to remove the cartridge from the cartridge guide is received from an electronic disk controller.

14. The method of claim 11, wherein the request to remove the cartridge from the cartridge guide is received from a host computer attached to the library.

15. The method of claim 11, wherein the first disk drive includes a first spindle for rotating disks, and the second step comprises the steps of:
    operating the first disk picker in the first disk drive to retrieve the first selected disk from the first multi-disk cartridge and to mount the first selected disk to the first spindle and then unlocking the first multi-disk cartridge.

16. The method of claim 11, wherein the second disk drive includes a spindle for rotating disks, and the fifth step comprises the steps of:
    operating the second disk picker in the second disk drive to retrieve the first selected disk from the second multi-disk cartridge and to mount the first selected disk to the second spindle and then unlocking the first multi-disk cartridge.

17. The method of claim 10, the locking step being performed only while the first disk drive is inserting a disk into or withdrawing a disk from the first multi-disk cartridge.

18. The method of claim 1, the first and second steps including the steps of:
    slidably receiving the first multi-disk cartridge with a cartridge guide;

operating a light sensor to detect presence of a reflective strip secured to the first multi-disk cartridge, wherein said light sensor is mounted proximate the cartridge guide such that the light sensor and the reflective strip are aligned when the first multi-disk cartridge is inserted into the cartridge guide;

if presence of the reflective strip is detected, using the first disk picker, to exchange a selected disk with the first multi-disk cartridge when the first multi-disk cartridge is fully inserted into the cartridge guide; and if presence of the reflective strip is not detected, preventing operation of the first disk picker.

19. The method of claim 1, the first and second steps comprising the steps of:

slidably receiving the first multi-disk cartridge with a cartridge guide;

detecting presence of the first multi-disk cartridge in the cartridge guide; and operating the first disk picker to transfer a disk between the first multi-disk cartridge and the first disk drive.

20. The method of claim 1, the first and second steps comprising the steps of:

slidably receiving the first multi-disk cartridge with a cartridge guide, said first multi-disk cartridge having a top-up or top-down orientation;

detecting the orientation of the multi-disk cartridge; and if the detected orientation matches a predetermined specification, operating the first disk picker to transfer a disk between the first multi-disk cartridge and the first disk drive.

* * * * *

UNITED STATES PATENT AND TRADEMARK OFFICE
CERTIFICATE OF CORRECTION

PATENT NO. : 6,298,017 B1　　　　　　　　　　　　　　　　　　　　Page 1 of 1
DATED : October 2, 2001
INVENTOR(S) : Kulakowski et al.

It is certified that error appears in the above-identified patent and that said Letters Patent is hereby corrected as shown below:

<u>Column 16,</u>
Line 9, change "step operating" to -- step of operating --.

Signed and Sealed this

Seventh Day of May, 2002

Attest:

Attesting Officer

JAMES E. ROGAN
*Director of the United States Patent and Trademark Office*